W. CAMPBELL.
Churn.
No. 25,383.
Patented Sept. 13, 1859.
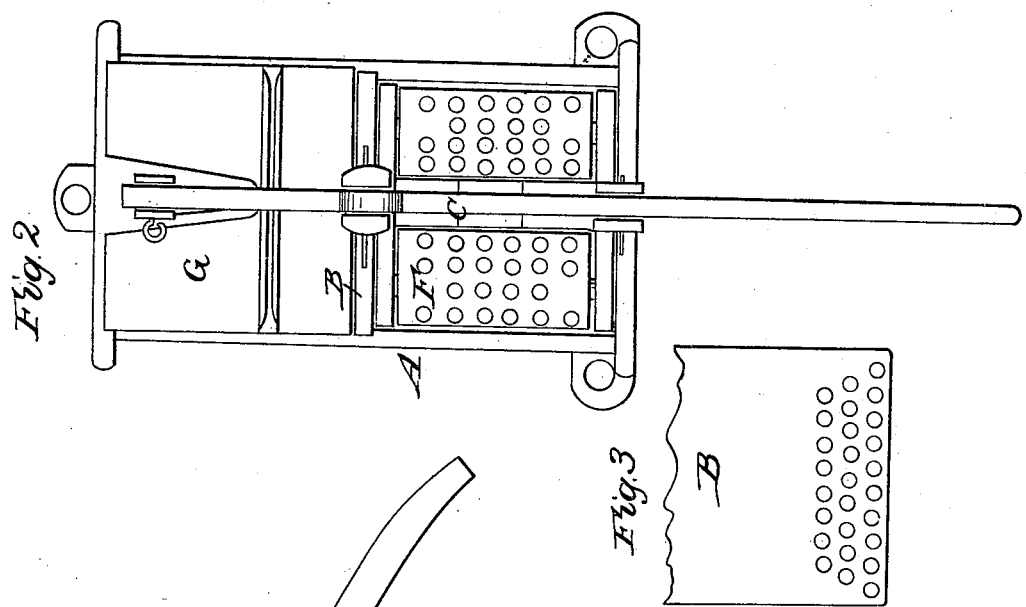
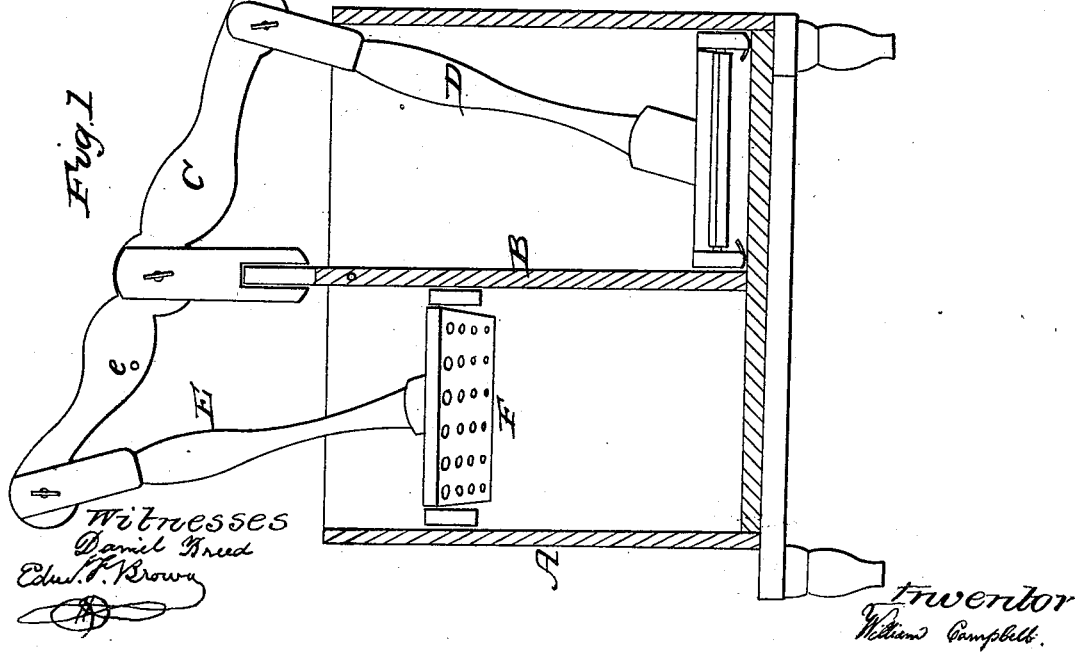

UNITED STATES PATENT OFFICE.

WILLIAM CAMPBELL, OF WATERLOO, PENNSYLVANIA.

CHURN.

Specification of Letters Patent No. 25,383, dated September 13, 1859.

*To all whom it may concern:*

Be it known that I, WILLIAM CAMPBELL, of Waterloo, in the county of Juniata and State of Pennsylvania, have invented a new and useful Improvement in Churns; and I do hereby declare that the following is a full and exact description thereof, reference being had to the accompanying drawings, and to the letters of reference marked thereon.

My invention consists of perforated hinged floats in the dasher head.

In the accompanying drawings, Figure 1, is a view of my churn with the side of the box removed in order to show the dashers. Fig. 2, is a top view of my churn. Fig. 3, represents a detached part.

The body of my churn may consist of any suitable box A. This box is divided by a removable partition B, the lower end of which is perforated, as seen in Fig. 3. Upon the upper end of partition B, is arranged a vibrating lever C which carries two dasher shafts, D and E, set obliquely into the dasher heads. These dasher heads are of peculiar construction, consisting of a frame into which two floats F are so hinged that one edge may fall as in Fig. 1, opening the dasher head, or rise as in Fig. 2, where the head is closed and fills the whole space of one end or division of the box. All the floats have series of openings through which the milk may pass. In working the lever C, one dasher rises as the other descends. The descending dasher has its floats F, closed by the resistance of the cream. As the dasher head fills the end of the box, the cream is partly driven downward into the opposite end of the churn. Some of the milk rises through the perforations in the descending dasher; then upon the return stroke of lever C the milk takes the opposite course. By this arrangement the milk is constantly drawn through the perforations in the dasher heads and in partition B. By this operation the air is forced thoroughly through the cream, the whole body of which is acted upon by every stroke of the lever. On account of the opening of the dasher head in its ascent, the cream is not liable to spatter over the top.

The cover G is made to fit either end of the box, but I prefer to use the churn with the cover on that end only of the box near the long arm of the lever. After the process of churning has advanced so that butter begins to form, the dasher shaft E, is detached from the lever C, and again connected with said lever at $c$. This change gives one dasher less motion than the other. All the butter collects around the dasher shaft E, and on account of the shortened stroke of this shaft, the butter is not churned over and over, as in most churns, but rises above the dasher head in the open end of the churn. The butter can be thence removed without removing the cover or waste upon the dasher heads.

When the butter has been removed, the buttermilk is drawn off in the usual manner through an opening at the bottom of the box. In washing the churn it is only necessary to pour in hot water, give a few strokes to lever C, and dashers, partition, box and all are completely cleansed. Then the dashers and partition B may be raised to the top of the churn and left to dry and air.

My churn is at once cheap and efficient. Its form may be somewhat varied without departing from the principle of my invention.

I am aware that churns have been made with two or more compartments, so that the cream will pass from one chamber to another, and that a lever with two dashers has been used; therefore I do not claim the divided box or lever working two dashers; I also know that dashers have been perforated and, in a swinging churn, hinged to a central partition, but I believe that my peculiar construction and arrangement of churn is both new and useful.

What I claim and desire to secure by Letters Patent of the United States is:

The perforated and hinged floats F, as an improvement in the construction of dasher-heads for churns.

WILLIAM CAMPBELL.

Witnesses:
  EDM. F. BROWN,
  DANIEL BREED.